US012344152B2

(12) United States Patent
Ruiz Lara

(10) Patent No.: US 12,344,152 B2
(45) Date of Patent: Jul. 1, 2025

(54) BEVERAGE CONTAINER HOLDER FOR USE DURING TAXI, TAKEOFF, AND LANDING OF AN AIRCRAFT

(71) Applicant: B/E Aerospace, Inc., Winston-Salem, NC (US)

(72) Inventor: Oscar Ruiz Lara, Kirkland, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 113 days.

(21) Appl. No.: 18/372,507

(22) Filed: Sep. 25, 2023

(65) Prior Publication Data

US 2025/0100437 A1    Mar. 27, 2025

(51) Int. Cl.
*B60N 3/10* (2006.01)
*B64D 11/00* (2006.01)

(52) U.S. Cl.
CPC ............ *B60N 3/108* (2013.01); *B64D 11/003* (2013.01)

(58) Field of Classification Search
CPC ............................... B60N 3/108; B64D 11/003
See application file for complete search history.

(56) References Cited

U.S. PATENT DOCUMENTS

| | | | |
|---|---|---|---|
| 8,001,671 B2 * | 8/2011 | Mitchell ............ | A47G 23/0225 29/469 |
| 9,758,080 B2 | 9/2017 | Goldman | |
| 9,919,631 B2 | 3/2018 | Huelke et al. | |
| 10,299,575 B2 * | 5/2019 | Andrews ................. | A45F 5/021 |
| 10,414,316 B2 * | 9/2019 | Llamas Maldonado ..................... | B60N 3/102 |
| 10,695,268 B2 | 6/2020 | Holk | |
| 11,382,443 B2 * | 7/2022 | Priefert ..................... | F16B 9/05 |
| 11,459,162 B2 * | 10/2022 | Adjeleian ............ | B65D 23/003 |
| 2005/0001125 A1 * | 1/2005 | Exler ................. | A47G 23/0225 248/309.1 |
| 2005/0006547 A1 * | 1/2005 | Exler ................. | A47G 23/0225 418/206.5 |

(Continued)

FOREIGN PATENT DOCUMENTS

WO    WO-2009105579 A2 *   8/2009   ............... A45F 5/02
WO       2014120463 A1      8/2014

OTHER PUBLICATIONS

European Patent Office, Extended European Search Report received in EP Application No. 24202621.9, Nov. 6, 2024, 6 pages.

*Primary Examiner* — Eret C McNichols
*Assistant Examiner* — Ding Y Tan
(74) *Attorney, Agent, or Firm* — Suiter Swantz IP

(57) ABSTRACT

A storage cubby for an aircraft including a housing having a front opening and an interior space accessible through the front opening, a fixed retention bar extending across the front opening, and a beverage container holder positioned in the interior space. In embodiments, the beverage container holder includes a bearing block having a bearing surface, a positioning magnet mounted to the bearing block, a catch mounted to the bearing block, and a strap having a first end mounted to the housing and a second end carrying a magnetic latch. During a first use condition of the strap, the magnetic latch is retained by the positioning magnet disengaged from the catch. During a second use condition of the strap, the magnetic latch is engaged with the catch. In embodiments, the first and second use conditions correspond to routine and high g-force events of the aircraft, respectively.

20 Claims, 8 Drawing Sheets

(56) References Cited

U.S. PATENT DOCUMENTS

| | | | |
|---|---|---|---|
| 2005/0224674 A1* | 10/2005 | Park | B60N 3/106 248/311.2 |
| 2007/0145760 A1* | 6/2007 | Gresham | B60N 3/106 296/37.13 |
| 2008/0060479 A1* | 3/2008 | Nelson | B67B 7/16 220/737 |
| 2011/0174831 A1* | 7/2011 | Zimmerman | B60N 3/108 220/737 |
| 2015/0237938 A1 | 8/2015 | O'Neill | |
| 2017/0349327 A1* | 12/2017 | Cwojdzinski | B65D 1/0223 |
| 2019/0099026 A1* | 4/2019 | Yadin | B60N 3/103 |
| 2019/0105236 A1* | 4/2019 | Holk | A61J 9/0638 |
| 2019/0298047 A1* | 10/2019 | Vanettes | A45F 5/00 |
| 2022/0219617 A1* | 7/2022 | Keating | B60R 7/046 |
| 2022/0390064 A1* | 12/2022 | Rogers | F16B 2/00 |
| 2023/0191977 A1* | 6/2023 | Paunovic | B60N 3/103 224/275 |

* cited by examiner

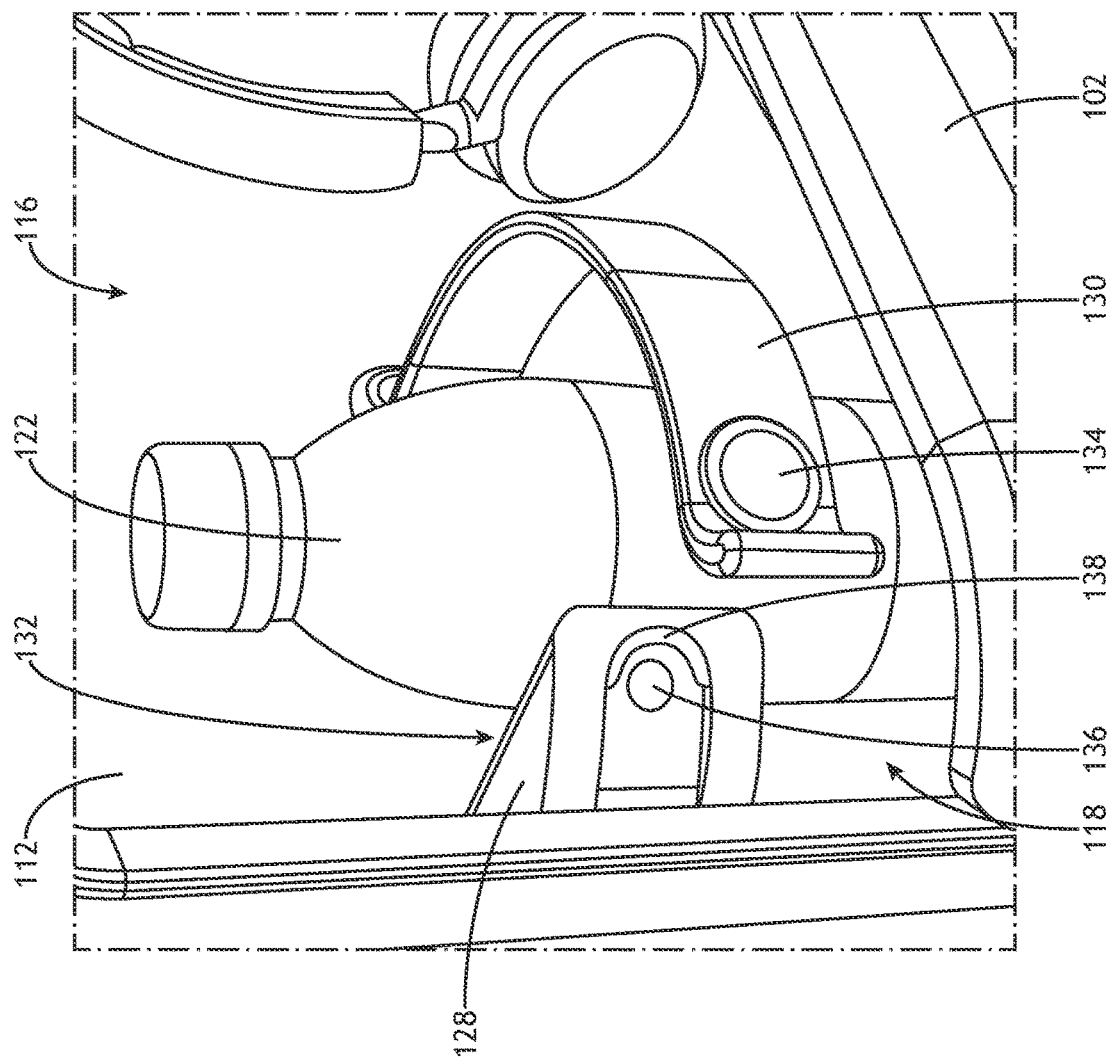

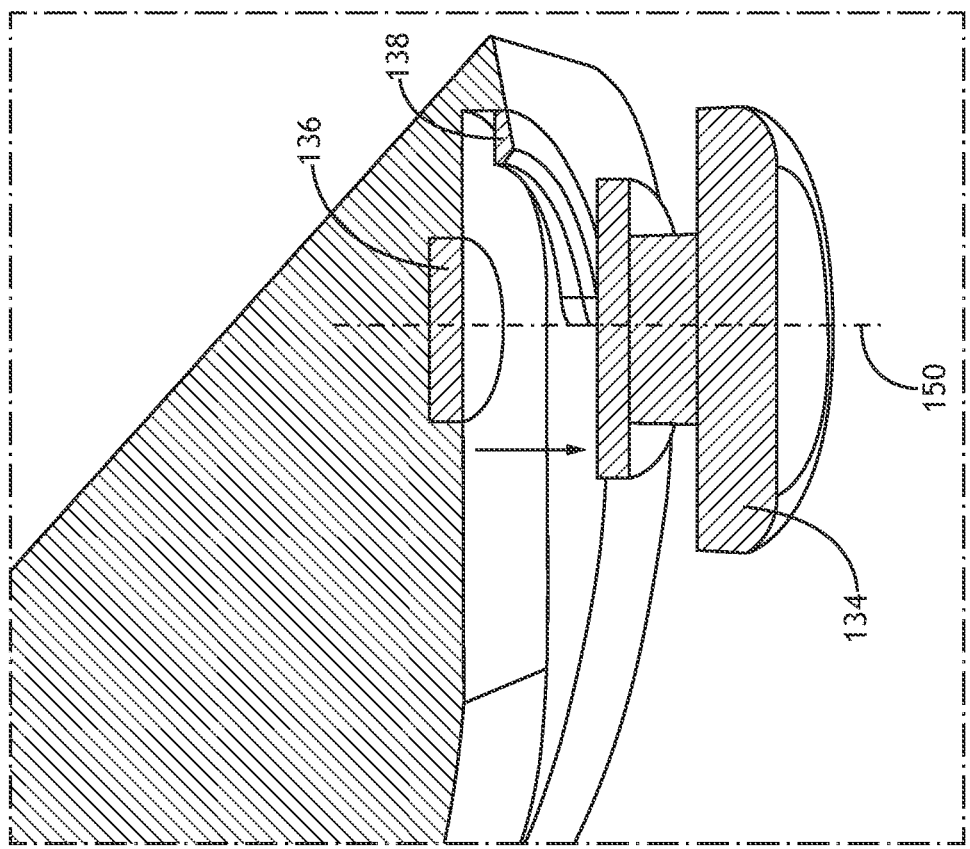

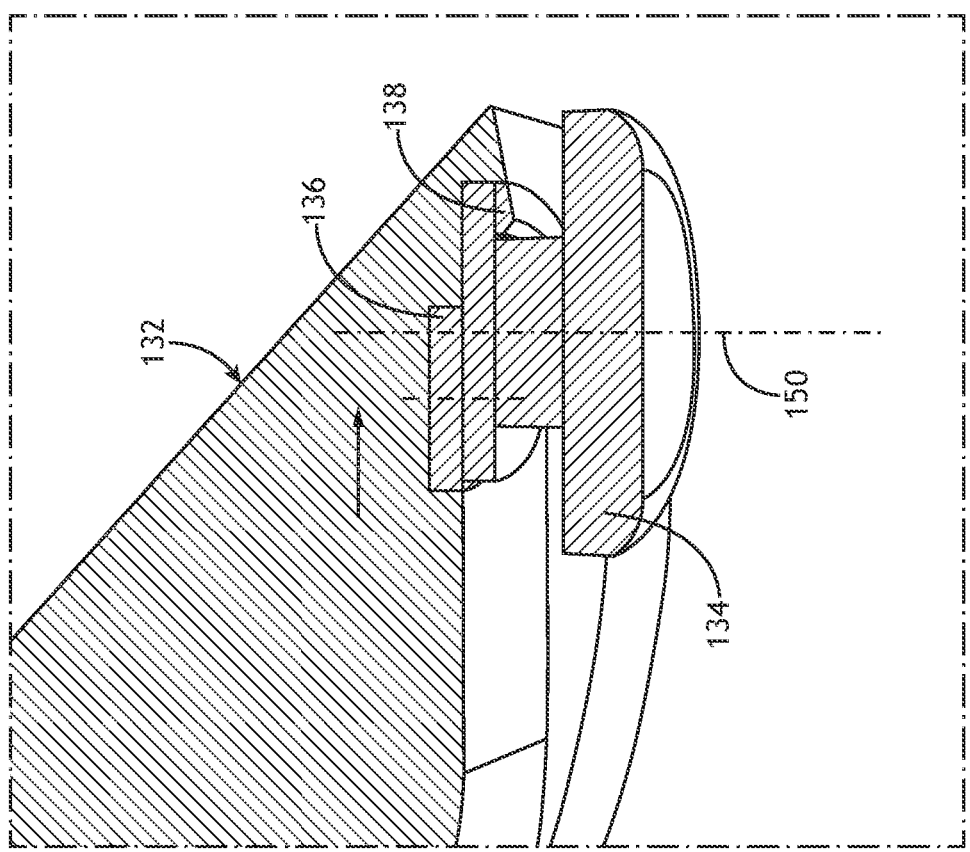

BEVERAGE CONTAINER HOLDER FOR USE DURING TAXI, TAKEOFF, AND LANDING OF AN AIRCRAFT

TECHNICAL FIELD AND BACKGROUND

The present disclosure relates generally to a beverage container holder for a vehicle, and more particularly, to a beverage container holder usable during taxi, takeoff, and landing (TTOL) of an aircraft.

Government agencies and airline carriers determine TTOL preparedness policies for passenger aircraft. Current policies affect, for example, the seating requirements of the passengers and flight crew, cabin lighting, position of the window shades, sitting positions, tray table stowage, charging of electronic devices, and use of portable electronic devices. The stowage of articles brought on board and acquired while on board are also part of TTOL preparedness policies.

Loose articles such as portable electronic devices and beverage containers are required to be managed during TTOL to prevent these items from becoming projectiles during a dynamic event such as extreme turbulence or a sudden deceleration. In economy class seats, these items may be held or stowed in a seatback pocket for convenient retrieval. In business class seats without a forward seat and seatback pocket, these items may be held or stowed within a closed compartment. Closed compartments are not convenient for stowing often used items.

Therefore, what is needed is a retention solution for stowing often used items, such as a beverage container, in an open space in the vicinity of a passenger seat.

BRIEF SUMMARY

Broadly, the present disclosure provides a beverage container holder for installation in a vehicle, for instance for use with a business class seat in an aircraft. The beverage container holder includes a strap configured to function differently during each of routine aircraft events and high g-force events, such that the beverage container holder can be used to secure a beverage container, positioned upright, in an open compartment during taxi, takeoff, and landing (TTOL).

In one aspect, the present disclosure provides a storage cubby for an aircraft. In embodiments, the storage cubby includes a housing having a front opening and an interior space accessible through the front opening, a fixed retention bar extending across the front opening, and a beverage container holder positioned in the interior space. In embodiments, the beverage container holder includes a bearing block having a bearing surface, wherein the bearing surface and a portion of the housing together delimit a space for receiving a beverage container positioned upright, a positioning magnet mounted to the bearing block, a catch mounted to the bearing block, and a strap having a first end mounted to the housing and a second end detached from the housing and carrying a magnetic latch. During a first use condition of the strap, the magnetic latch is retained by the positioning magnet and the magnetic latch is disengaged from the catch. During a second use condition the strap, the magnetic latch is engaged with the catch.

In at least some embodiments, the first use condition of the strap occurs when a beverage container held in the space delimited in part by the bearing surface is stationary, and the second use condition of the strap occurs when a beverage container held in the space delimited in part by the bearing surface moves in a direction away from the bearing surface.

In at least some embodiments, the first use condition of the strap occurs during less than 16 g-force events of the aircraft, and the second use condition of the strap occurs during 16 g-force or greater events of the aircraft.

In at least some embodiments, the positioning magnet and the magnetic latch are axially aligned during the first use condition of the strap, and the positioning magnet and the magnetic latch are axially misaligned during the second use condition of the strap.

In at least some embodiments, the catch includes a raised retaining element, the magnetic latch includes an annular element, and during the second use condition of the strap, the annular element of the magnetic latch is retained by the raised retaining element such that a load transmitted to the strap, from movement of a held beverage container, is transmitted from the annular element to the raised retaining element.

In at least some embodiments, the housing has a closed top, a closed bottom, a closed back, and closed sides.

In some embodiments, the fixed retention bar extends substantially horizontally across the front opening, and the fixed retention bar is positioned nearer to a bottom of the interior space as compared to the strap.

In some embodiments, the space for receiving a beverage container positioned upright is delimited by the bearing surface and a closed back of the housing.

In some embodiments, the bearing surface is angled relative to an axis of the positioning magnet, and the bearing surface is angled relative to a vertical plane aligned with the front opening.

In some embodiments, the strap is flexible.

In some embodiments, the strap is rigid and the first end of the strap is hingedly mounted to a closed back of the housing.

In some embodiments, the stowage cubby further includes a closeable latch positioned in the interior space configured to hold over-ear headphones.

According to another aspect, the present disclosure provides a beverage container holder for a vehicle, for instance for use with a business class seat in an aircraft. In embodiments, the beverage container holder includes a bearing block mountable to a wall, the bearing block having a bearing surface, and the bearing surface delimiting part of a space for receiving a beverage container positioned upright. The beverage container holder further includes a positioning magnet mounted to the bearing block, a catch mounted to the bearing block, the catch positioned alongside the positioning magnet in a direction of the bearing surface, and a strap having a first end mountable to a wall and a second end carrying a magnetic latch. During a first use condition of the strap, the magnetic latch is retained by the positioning magnet, and the magnetic latch is disengaged from the catch. During a second use condition the strap, the magnetic latch is engaged with the catch.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 2B is a perspective view of the beverage container holder showing the strap in an unlatched condition, in accordance with example embodiments of this disclosure;

FIG. 5B is a lateral cross-section through the bearing block showing a passenger pull direction of the strap, in accordance with example embodiments of this disclosure; and FIG. 5C is a lateral cross-section through the bearing block showing axial misalignment of the magnetic latch and positioning magnet, and engagement of the magnetic latch with the catch, in accordance with example embodiments of this disclosure.

DETAILED DESCRIPTION

Figure 1:
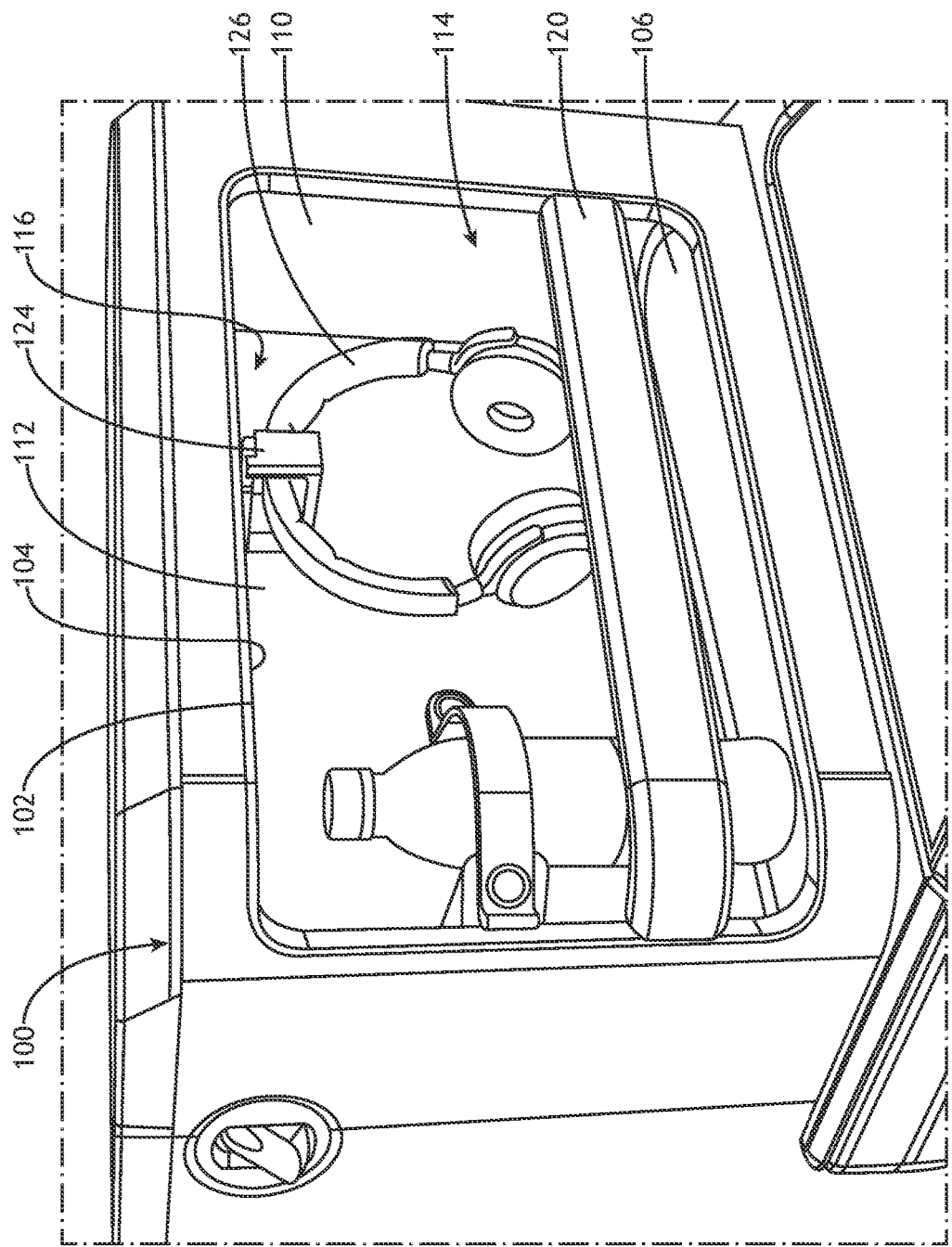
FIG. 1 is a perspective view of a stowage cubby including a beverage container holder for use with, for example, a business class seat in an aircraft, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to stowage cubby solutions including a beverage container holder for installation in a vehicle, for instance a passenger cabin in an aircraft. In a non-limiting application, the stowage cubby is installable in connection with a business class seat in an aircraft. The beverage container holder includes a strap configured to operate differently according to different conditions of the aircraft. For example, according to a first condition of the aircraft corresponding to routine aircraft events (e.g., taxi, takeoff, and landing (TTOL), flight, minor turbulence, events less than 16G, etc.), the strap includes a magnetic latch that interacts with a positioning magnet to maintain the strap in a closed condition, and allows the strap to be pulled axially away from the positioning magnet to unlatch the strap. According to a second condition of the aircraft corresponding to emergency aircraft events (e.g., major turbulence, extreme decelerations, 16G and greater events, etc.), the strap includes a magnetic latch that interacts with a catch for transferring pulling forces on the strap, from the moving beverage container, and preventing the strap from being unlatched. In embodiments, the beverage container seats in a space delimited by a bearing block and a portion of the housing, and the bearing block forms a bearing surface angled to direct the momentum of the beverage container in a direction that engages the magnetic latch with the catch. As such, the beverage container holder is suitable for use in an open compartment during TTOL of an aircraft.

FIG. 1 illustrates a storage cubby 100 according to an embodiment of the present disclosure. The storage cubby 100 may be installed in, for example, a console positioned to one side of a passenger seat, for instance a business class seat in an aircraft passenger cabin. In embodiments, the storage cubby 100, for instance implemented as an open compartment, includes a housing 102. In some embodiments, the housing 102 may be a standalone structure or may be part of a larger structure. In embodiments, the housing 102 has a closed top 104, a closed bottom 106, closed sides 108, 110, a closed back 112, a front opening 114 (e.g., open front), and an interior space 116 accessible through the front opening 114. The front opening 114 may be oriented substantially facing the seated passenger such that regular use items can be stowed in the interior space for convenient retrieval.

The storage cubby 100 further includes a beverage container holder 118 positioned in the interior space 116. In embodiments, the storage cubby 100 includes a fixed retention bar 120 that extends from side-to-side of the housing across the front opening 114. The fixed retention bar 120 may be positioned along a vertical plane of the front opening 114 and positioned nearer the closed bottom 106 than to the closed top 104. In this position, the fixed retention bar 120 and the closed back 112 delimit a space therebetween for positioning a beverage container 122, for instance a water bottle, in an upright position. In use, the fixed retention bar 120 is positioned to retain a lower portion of the beverage container 122 and the beverage container holder 118 is positioned to retain an upper portion of the beverage container 122. In use, the fixed retention bar 120 and the beverage container holder 118 cooperate to prevent the beverage container 122 from tipping over within the interior space 116 and from being ejected from the interior space 116. In some embodiments, the fixed retention bar 120 may include linear and/or curved portions depending on the shape of the housing 102 and the front opening 114.

In some embodiments, the storage cubby 100 may further include a closeable latch 124 positioned in the interior space 116 for securing a pair of over-ear headphones 126. In some embodiments, the closeable latch 124 is mounted to the closed top 104 and/or closed back 112 of the housing 102, and is positioned alongside the beverage container holder 118 such that the interior space 116 is elongated and has a relatively shallow depth.

Figure 2A:
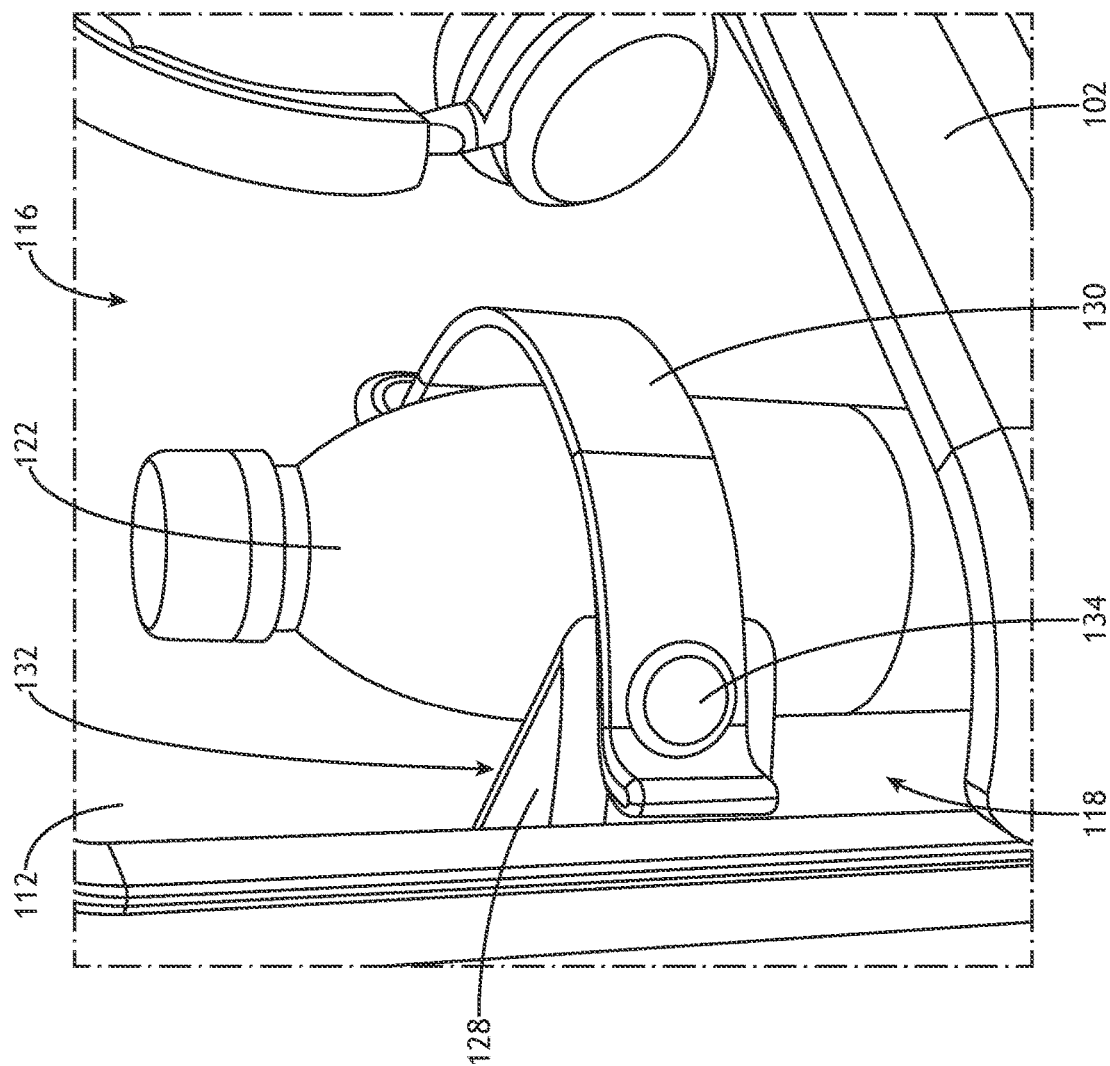
FIG. 2A is a perspective view of the beverage container holder showing the strap in a latched condition, in accordance with example embodiments of this disclosure.

FIG. 2A illustrates a latched condition of the beverage container holder 118, and FIG. 2B illustrates an unlatched condition of the beverage container holder 118. The beverage container holder 118 generally includes a bearing block 128 mounted in the interior space 116, and a strap 130 configured to interact with the bearing block 128. The bearing block 128 may be mounted to at least one of a closed side and the closed back 112 of the housing 102, which side depending on the direction of flight. As discussed further below, the bearing block 128 defines an angled bearing surface 132 delimiting part of a space for receiving the beverage container 122 positioned upright. In some embodiments, the space for receiving the beverage container 122 is delimited between the bearing surface 132 and the closed back 112 of the housing 102. When latched, the strap 130 is positioned about an upper portion of the beverage container 122, while the fixed retention bar 120 is positioned about a lower portion of the beverage container 122. As discussed in detail below, the strap 130 carries a magnetic latch 134 that interacts with a positioning magnet 136 and a catch 138 mounted to the bearing block 128 in the first and second use conditions of the strap 130, respectively. In embodiments, the strap 130, which may be flexible or rigid, may be mounted at one end, hingedly or otherwise, to an interior wall within the housing 102.

Figure 3:
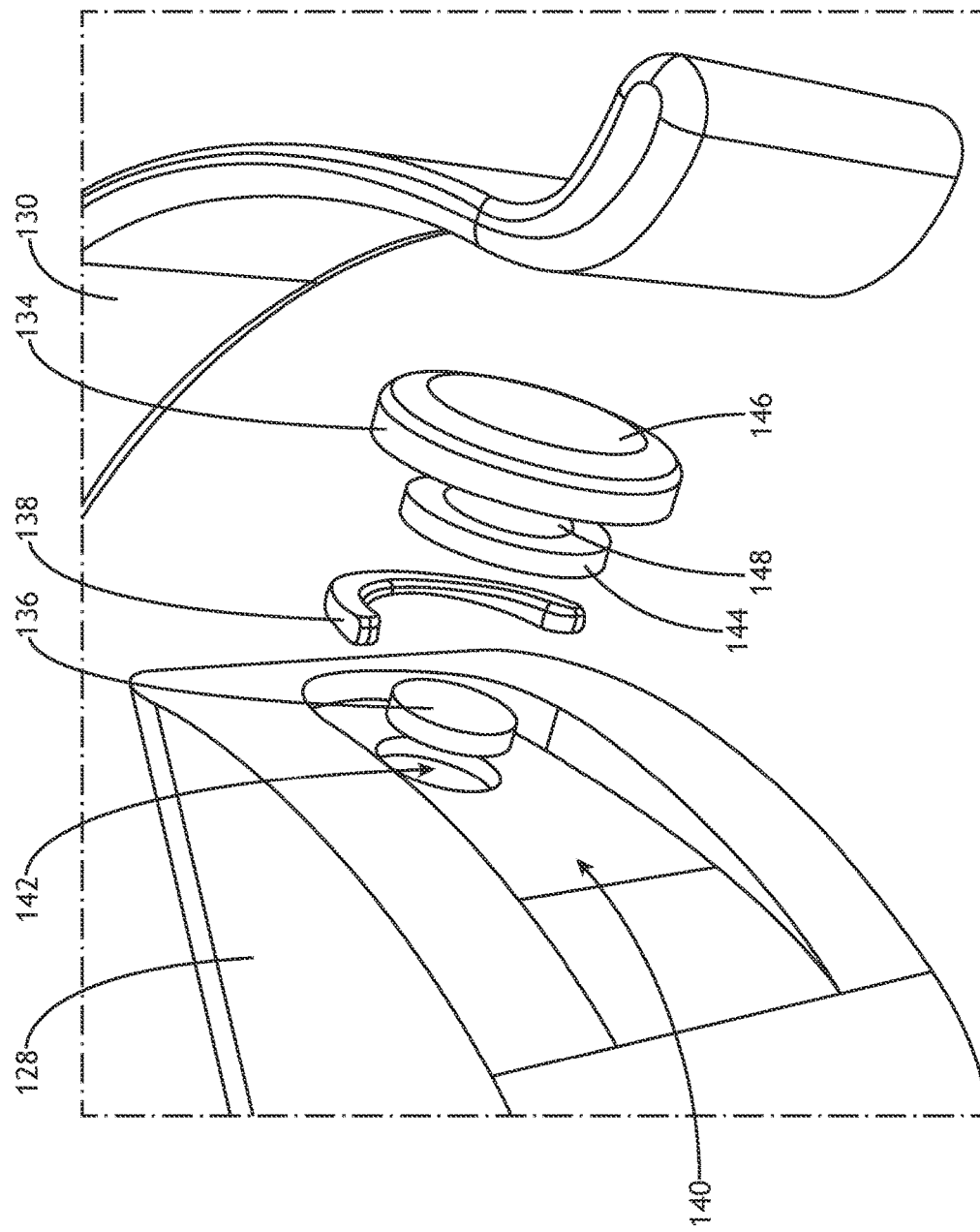
FIG. 3 is an exploded view of a portion of the beverage container holder, in accordance with example embodiments of this disclosure.

FIG. 3 illustrates a non-limiting example of a latch and catch assembly for maintaining a latched condition of the strap 130. As shown, the bearing block 128 forms a recess 140 in which each of the positioning magnet 136 and the catch 138 are mounted. A further recess 142 is formed for receiving the positioning magnet 136. The catch 138, which is shown as a C-shaped element, opens in the direction of the positioning magnet 136. The magnetic latch 134 includes a base 144 and a head 146 interconnected by a stem 148, at least one or more of which may be constructed from or include a magnetic element. The catch 138 and magnetic latch 134 are shaped such that, when the two are engaged during the second use of the strap 130, the base 144 is positioned 'behind' the catch 138 to prevent the magnetic latch 136 from being disengaged, i.e., pulled apart, from the catch 138.

Figure 4:
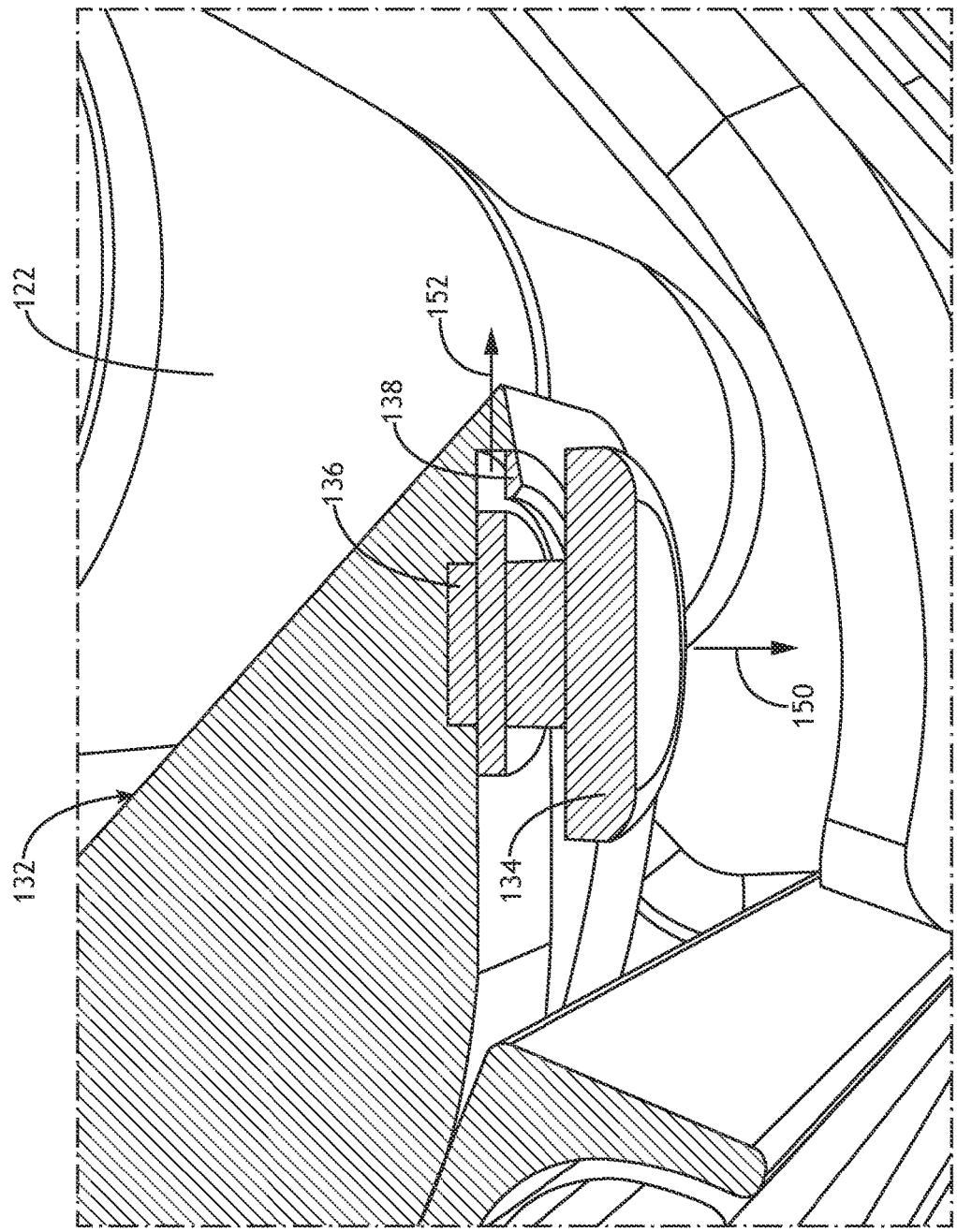
FIG. 4 is a lateral cross-section through the bearing block showing pull directions corresponding to the first and second use conditions of the strap, in accordance with example embodiments of this disclosure.

FIG. 4 illustrates the first use condition of the strap (not shown) in which the magnetic latch 134 and the positioning magnet 136 are axially aligned. In this configuration, the magnetic latch 134 is disengaged from the catch 138. As such, the strap is configured to be pulled, for instance by pulling on the tab formed at the end of the strap, in the axial direction as illustrated at directional arrow 150 to overcome the magnetic attraction to unlatch the strap. Directional arrow 152 illustrates the beverage container pull direction resulting from movement of the beverage container 122 from a sufficient g-force event. The bearing surface 132 is shown angled relative to the pulling direction 150, and angled such that the momentum of the moving beverage container 122 causes the strap to be pulled to move the magnetic latch 134 into engagement with the catch 138. In embodiments, the bearing surface 132 is inclined, and is not perpendicular to the pulling direction 150, thereby defining a non-orthogonal motion path for the moving beverage container 122. The degree and direction of the angle of the bearing surface 132 may be determined by the flight direction depending on the orientation of the installed beverage container holder.

Figure 5A:
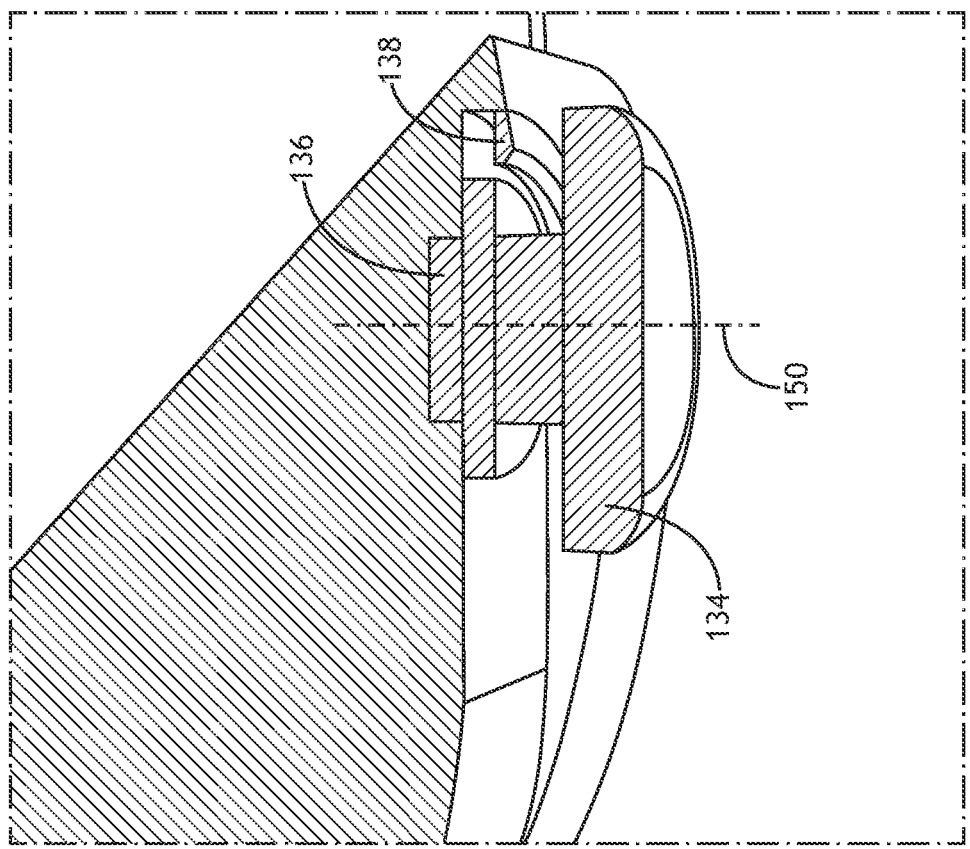
FIG. 5A is a lateral cross-section through the bearing block showing axial alignment of the magnetic latch and positioning magnet during a first use condition of the strap, in accordance with example embodiments of this disclosure.

FIG. 5A illustrates the first use condition in which the magnetic latch 134 is axially aligned with the positioning magnet 136. In use, the magnetic attraction of the positioning magnet 136 positions the magnetic latch 134 aligned with the positioning magnet 136 and out of engagement (e.g., to the side) of the catch 138 such that the strap can be pulled axially along the alignment axis 150 to unlatch the strap. FIG. 5B illustrates pulling force applied by the user to magnetically decouple the magnetic latch 134 from the positioning magnet. FIG. 5C illustrates the magnetic latch 134 shifted to one side thereby axially misaligning the magnetic latch 134 and the positioning magnet 136, and positioning the magnetic latch 134 in engagement with the catch 138. The shift to one side is the result of pulling force on the strap (not shown) from the beverage container (not shown) moving along the motion path defined by the bearing surface 132. In this configuration, which depicts the second use condition of the strap, the strap cannot be unlatched by pulling in the direction of the axis 150, and force on the strap is transmitted to the catch 138 through the magnetic latch 134.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A storage cubby for an aircraft, comprising:
 a housing having a front opening and an interior space accessible through the front opening;

a fixed retention bar extending across the front opening; and a beverage container holder positioned in the interior space, the beverage container holder comprising:
  a bearing block having a bearing surface, wherein the bearing surface and a portion of the housing together delimit a space for receiving a beverage container positioned upright;
  a positioning magnet mounted to the bearing block;
  a catch mounted to the bearing block, the catch positioned to one side of the positioning magnet; and
  a strap having a first end mounted to the housing and a second end detached from the housing, the second end carrying a magnetic latch;
  wherein, during a first use condition of the strap, the magnetic latch is retained by the positioning magnet, and the magnetic latch is disengaged from the catch; and
  wherein, during a second use condition the strap, the magnetic latch is engaged with the catch.

2. The storage cubby according to claim 1, wherein:
the first use condition of the strap occurs when a beverage container held in the space delimited in part by the bearing surface is stationary; and
the second use condition of the strap occurs when a beverage container held in the space delimited in part by the bearing surface moves in a direction away from the bearing surface.

3. The storage cubby according to claim 1, wherein:
the first use condition of the strap occurs during less than 16 g-force events of the aircraft; and
the second use condition of the strap occurs during 16 g-force or greater events of the aircraft.

4. The storage cubby according to claim 1, wherein:
during the first use condition of the strap, the positioning magnet and the magnetic latch are axially aligned; and
during the second use condition of the strap, the positioning magnet and the magnetic latch are axially misaligned.

5. The storage cubby according to claim 1, wherein:
the catch comprises a raised retaining element;
the magnetic latch comprises an annular element; and
during the second use condition of the strap, the annular element of the magnetic latch is retained by the raised retaining element such that a load transmitted to the strap, from movement of a held beverage container, is transmitted from the annular element to the raised retaining element.

6. The storage cubby according to claim 1, wherein the housing has a closed top, a closed bottom, a closed back, and closed sides.

7. The storage cubby according to claim 1, wherein:
the fixed retention bar extends substantially horizontally across the front opening; and
the fixed retention bar is positioned nearer to a bottom of the interior space as compared to the strap.

8. The storage cubby according to claim 1, wherein the space for receiving a beverage container positioned upright is delimited by the bearing surface and a closed back of the housing.

9. The storage cubby according to claim 1, wherein:
the bearing surface is angled relative to an axis of the positioning magnet; and
the bearing surface is angled relative to a vertical plane aligned with the front opening.

10. The storage cubby according to claim 1, wherein the strap is flexible.

11. The storage cubby according to claim 1, wherein:
the strap is rigid, and
the first end of the strap is hingedly mounted to a closed back of the housing.

12. The storage cubby according to claim 1, further comprising a closeable latch positioned in the interior space configured to hold over-ear headphones.

13. A beverage container holder, comprising:
  a bearing block mountable to a wall, the bearing block having a bearing surface, and the bearing surface delimiting part of a space for receiving a beverage container positioned upright;
  a positioning magnet mounted to the bearing block;
  a catch mounted to the bearing block, the catch positioned alongside the positioning magnet in a direction of the bearing surface; and
  a strap having a first end mountable to a wall and a second end carrying a magnetic latch;
  wherein, during a first use condition of the strap, the magnetic latch is retained by the positioning magnet, and the magnetic latch is disengaged from the catch; and
  wherein, during a second use condition the strap, the magnetic latch is engaged with the catch.

14. The beverage container holder according to claim 13, wherein:
the first use condition of the strap occurs when a beverage container held in the space delimited in part by the bearing surface is stationary; and
the second use condition of the strap occurs when a beverage container held in the space delimited in part by the bearing surface moves in a direction away from the bearing surface.

15. The beverage container holder according to claim 13, wherein:
during the first use condition of the strap, the positioning magnet and the magnetic latch are axially aligned; and
during the second use condition of the strap, the positioning magnet and the magnetic latch are axially misaligned.

16. The beverage container holder according to claim 13, wherein:
the catch comprises a raised retaining element;
the magnetic latch comprises an annular element; and
during the second use condition of the strap, the annular element of the magnetic latch is retained by the raised retaining element such that a load transmitted to the strap, from movement of a held beverage container, is transmitted from the annular element to the raised retaining element.

17. The beverage container holder according to claim 13, wherein:
the bearing surface is angled relative to an axis of the positioning magnet; and
the bearing surface is angled relative to a vertical plane aligned with the front opening.

18. The beverage container holder according to claim 13, wherein the strap is flexible.

19. The beverage container holder according to claim 13, wherein the strap is rigid and the first end of the strap is connectable to a hinge.

20. The beverage container holder according to claim 1, mountable in an interior space formed in a housing, wherein the space for receiving a beverage container positioned upright is further limited in part by a wall defining the interior space.

* * * * *